March 21, 1939. A. BERGER 2,151,075
FLUID POWER TRANSMISSION
Filed Feb. 26, 1938 3 Sheets-Sheet 1

Inventor.
ARTHUR BERGER
ATTORNEYS

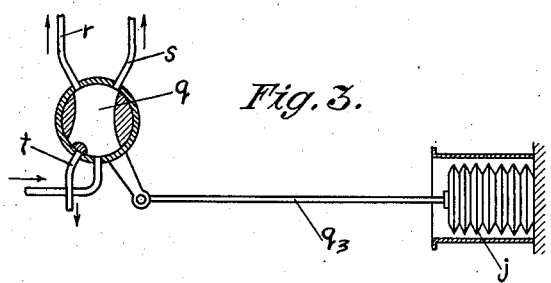
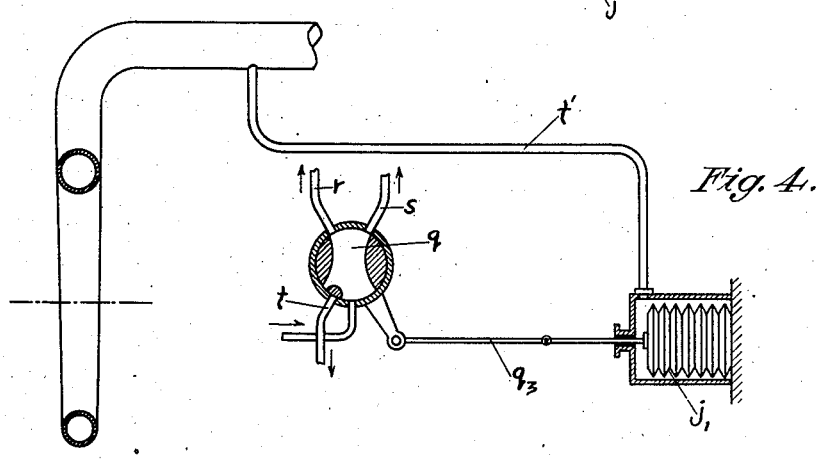

March 21, 1939. A. BERGER 2,151,075
FLUID POWER TRANSMISSION
Filed Feb. 26, 1938 3 Sheets-Sheet 3

Inventor:
ARTHUR BERGER
by
ATTORNEYS

Patented Mar. 21, 1939

2,151,075

UNITED STATES PATENT OFFICE 2,151,075

FLUID POWER TRANSMISSION

Arthur Berger, Oberturkheim, near Stuttgart, Germany, assignor to Daimler-Benz Aktiengesellschaft, Stuttgart-Unterturkheim, Germany Application February 26, 1938, Serial No. 192,711
In Germany February 23, 1937

9 Claims. (Cl. 60—54)

This invention relates to an improved fluid transmission and is particularly concerned with such a transmission when applied to the driving of super-charging blowers of internal combustion engines.

One object of the invention is to provide a combination of two or more fluid transmissions with slip control means whereby a variable transmission is achieved.

Another object is to provide fluid transmissions in series with slip control means adapted for controlling the several transmissions in dependence one upon another or independently of one another.

The slip control is advantageously effected by filling and emptying the transmissions or by varying the filling thereof.

One advantage of the invention over a single fluid transmission device is that the slip in individual transmission devices is reduced and thereby undue heating of such devices (which heating increases extremely quickly with increasing slip) is avoided. Furthermore, the invention enables a graduation of the total slip, and consequently of the power transmission or transmission ratio, to be achieved in a simple and reliable manner by a partial emptying of the transmission devices in succession.

Further objects and features will appear from the description of the annexed drawings which illustrate two arrangements in accordance with the invention, these being given by way of example only.

In the drawings:

Figure 3 is a longitudinal elevation partially in cross-section of a modified type of valve control as used with the valve illustrated in Fig. 1;

Figure 4 is a longitudinal elevation partially in cross-section of still a further form of valve control which may be used in combination with the valve shown in Fig. 1;

Figure 5 is a longitudinal elevation partially in cross-section of a modified pump and control arrangement which may be used in place of that illustrated in Fig. 2;

Figure 1:
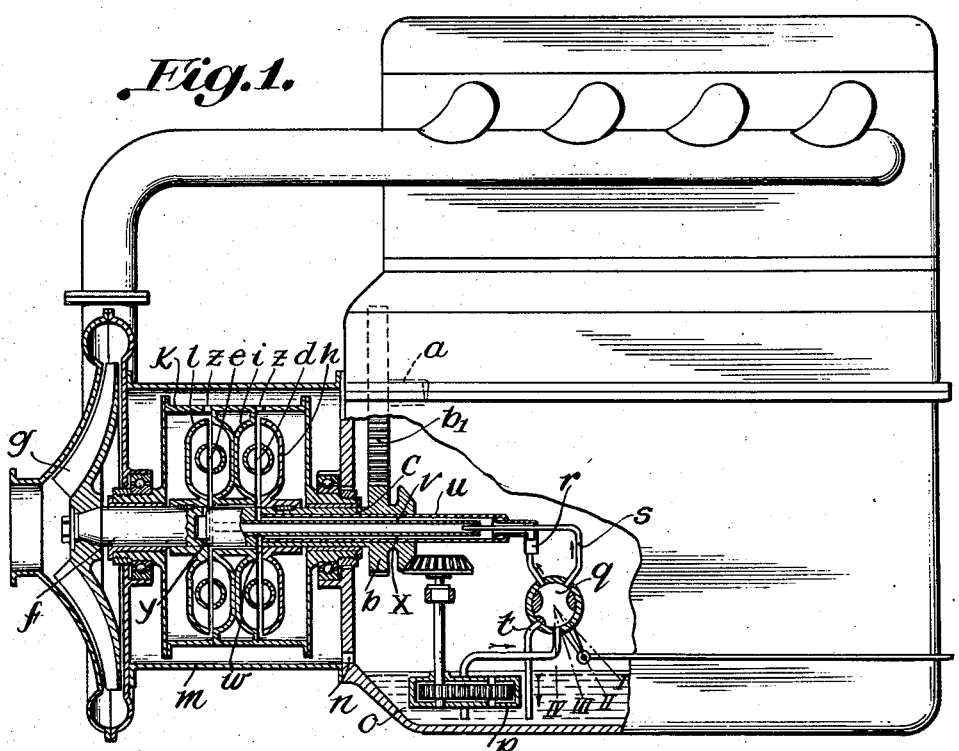
Figure 1 is a more or less diagrammatic longitudinal sectional elevation of a blower driven through a transmission comprising two fluid transmission devices in series.

Referring to Figure 1, $a$ is a driving shaft, for example the crank shaft of an internal combustion engine or a shaft driven thereby which, through two gear wheels $b$ and $b_1$ drives a shaft $c$ at higher speed than the speed of rotation of shaft $a$. The latter is coupled by two fluid transmissions $d$ and $e$, connected in series, to the shaft $f$ of the blower impeller $g$.

The fluid transmissions $d$ and $e$ are constructed after the fashion of Föttinger transmissions and consist of a driving half $h$ fixedly connected to the shaft $c$, a middle part $i$ driven thereby, this part including both the driven half of the first transmission $d$ and the driving half of the second transmission $e$, and a driven transmission half $l$ of the second transmission $e$ fixed on the blower shaft $f$. The middle part $i$ constitutes part of a structure that includes a transmission housing $k$, the latter being either revolubly mounted in fixed bearings or, as shown, adapted for running on bearings on the shaft parts.

The operation of the above described arrangement will be obvious to those skilled in the art and need not be discussed in detail. The shaft $c$ being driven from the engine through gears $b$ and $b_1$ drives the member $h$. If fluid is present between the member $h$ and the member $i$, the member $h$ will act as an impeller to drive the free intermediate member $i$ acting as a turbine. This free member also includes a part which, under the proper fluid conditions, will act as an impeller driving the driven member $l$ connected to the blower $g$. If the transmissions $d$ and $e$ are both filled with fluid, there will accordingly be a direct power connection between the engine and blower.

The transmission assembly is arranged inside a casing $m$ which is connected by a return pipe $n$ to a vessel $o$, here illustrated as an engine oil sump, containing the working liquid, for example oil, for the transmissions. A pump, for example a gear wheel pump $p$ driven continuously by the engine, supplies the liquid to a distributing cock $q$ which may be adjusted as desired, for example by hand or automatically. The cock can be adjusted to supply liquid to the passage $r$ or to the passage $s$, or to both simultaneously, depending upon the position of the cock. Or, the oil supplied by the pump $p$ may be conducted directly back to the vessel $o$ by a return passage $t$ when the transmission is to be idle.

From the passage $r$, the liquid is supplied to the pipe $u$ and the annular passage $v$ in the shaft $c$ and by radial ports $w$ to the interior of the transmission $d$, whilst the oil supplied through the passage $s$ is conducted through an inner tube $x$ and radial ports $y$ to the clutch $e$. Small ports or throttles $z$ in the transmission housing $k$ permit of outflow of the liquid from the transmissions.

In the illustrated position of the cock $q$ (position II of the control lever), both passages $r$ and $s$ are in full communication with the liquid circulation so that the two fluid transmissions are filled and have a minimum slip for the maximum transmission of power. The blower $g$ then runs at high speed.

By turning the cock $q$ to the left or counter-clockwise, the flow of the liquid to the passage $s$ and, therefore, to the transmission $e$ is more or less throttled. The transmission $e$ consequently then runs partly empty so that an increased slip arises between the transmission halves $i$ and $l$, whilst the transmission $d$ is still completely filled. Consequently the blower runs with the speed substantially reduced by the slip of the transmission $e$. In the limiting case (position I of the control lever), the passage $s$ is completely closed and the transmission $e$ may become completely emptied.

If the cock $q$ is turned to the right, then conversely the flow of the liquid to the passage $r$ and, therefore, to the transmission $d$ is throttled so that the latter runs partly empty, whilst the transmission $e$ remains filled. This again causes the speed of the blower to be reduced substantially below the maximum speed, owing to the slip of the transmission $d$.

By yet further adjustment of the cock $q$ to the right (position III of the control lever), first of all the transmission $d$ is cut off completely and thereafter also the transmission $e$ (position IV), whilst at the same time the return passage $t$ is opened so that the liquid delivered by the pump $p$ flows back directly into the vessel $o$. In this case, the transmission is ineffective and the blower runs idly.

Figure 2:
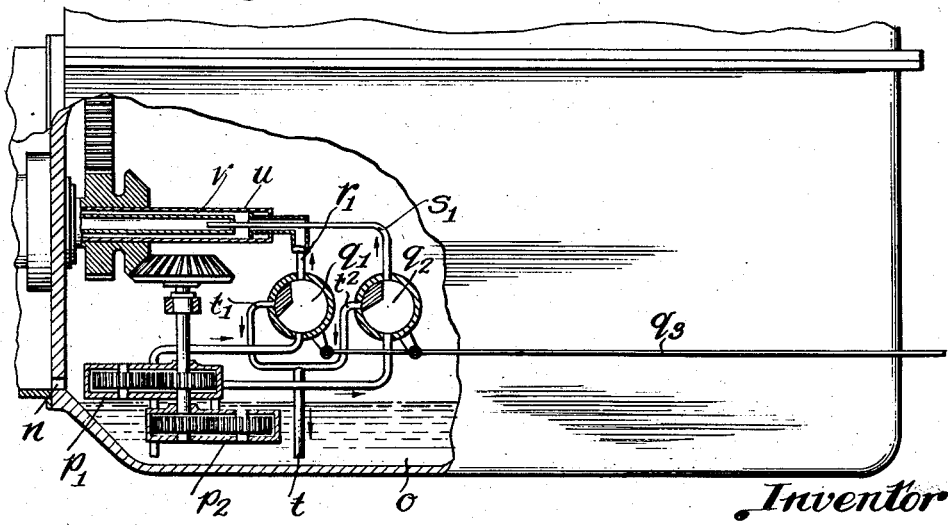
Figure 2 is a diagrammatic view showing a modified control for the fluid transmission devices.

With the circuit illustrated in Fig. 2, separate pumps $p_1$ and $p_2$ and also separate control cocks $q_1$ and $q_2$, which are actuated by a common linkage $q_3$, are provided for each passage $r_1$, $s_1$.

In the illustrated position, the passages $r_1$, $s_1$ and consequently the fluid transmissions $d$ and $e$ are in full communication with the circulation. By displacing the linkage $q_3$ to the left, first of all the passage $s_1$ is throttled and the filling of the transmission $e$ is thus reduced. Only after a certain displacement, is the transmission $d$ also cut off by gradual closure of the passage $r_1$ until ultimately both transmissions run empty. At the same time, the return passages $t_1$ and $t_2$ are opened to a corresponding extent by the cocks $q_1$, $q_2$ so that the liquid supplied by the pumps $p_1$, $p_2$ flows back in part, and finally wholly, into the vessel $o$.

As an example of the automatic valve adjustment described above, attention is directed to Fig. 3 wherein a device $j$, which may be in the form of a bellows, is responsive to external air pressure and operates upon the valve $q$ through a connecting rod $q_3$. If automatic control responsive to the pressure of the blower is desired, an arrangement such as illustrated in Fig. 4 may be used. In this case a pressure responsive bellows $j_1$ is operatively connected with the valve $q$ through the connecting rod $q_3$. Pressure of the blower is transmitted to the bellows $j_1$ by suitable means here indicated as conduit $t'$.

The arrangements illustrated in Figs. 3 and 4 have been drawn in connection with the single valve arrangement illustrated in Fig. 1. It is obvious, however, that they may be used with the double valve arrangement shown in Fig. 2. If, moreover, it is desired that each of the valves $q_1$ and $q_2$ (Fig. 2) be separately controlled by separate pressure responsive devices, an arrangement such as shown in Fig. 5 may be used. In this modified arrangement the valve $q_2$ is interconnected with the bellows $j'$ through suitable means such as a connecting rod $q'_3$ while the valve $q_1$ is interconnected with the bellows $j''$ by the connecting rod $q''_3$. The arrangement illustrated in Fig. 5 shows a variation of that illustrated in Fig. 2. In Fig. 5 the separate pumps $p_1$ and $p_2$ have been replaced by a single pump $p_3$.

Figure 6:
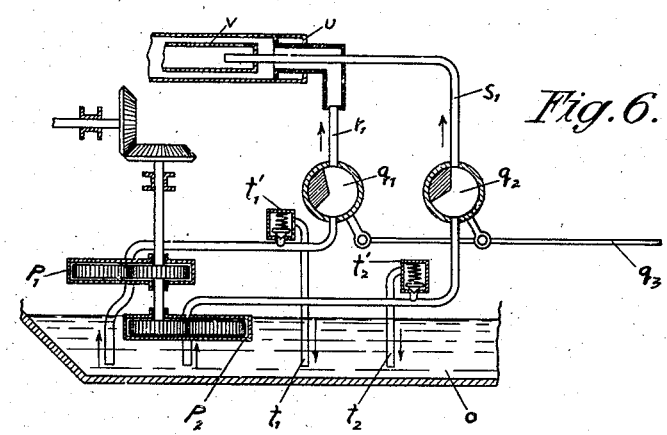
Figure 6 is a longitudinal elevation partially in cross-section of a modified valve arrangement which may be used in place of that shown in Fig. 2.

Fig. 6 illustrates another simple modification of my control system. Instead of providing separate conduits $t_1$ and $t_2$ leading directly from the valve as in Fig. 2, these outlet conduits may be connected directly with the supply conduit from the pumps through the medium of spring loaded valve $t'_1$ and $t'_2$ respectively. Accordingly, in the arrangement shown in Fig. 6 the valves $q_1$ and $q_2$ will act solely to cut off or turn the supply of fluid from the pumps $p_1$ and $p_2$ to the supply conduits $r_1$ and $s_1$. When these valves are in their closed position, the pressure will build up in the conduits leading from the pump, and when it has reached a predetermined amount, the valves $t'_1$ and $t'_2$ will open, thus permitting free circulation of the fluid to the sump $o$ through the outlet conduits $t_1$ and $t_2$. This arrangement is the full equivalent of that illustrated in Fig. 1 but makes the construction of the valves $q_1$ and $q_2$ considerably simpler and in some cases, may be desirable.

Figure 7:
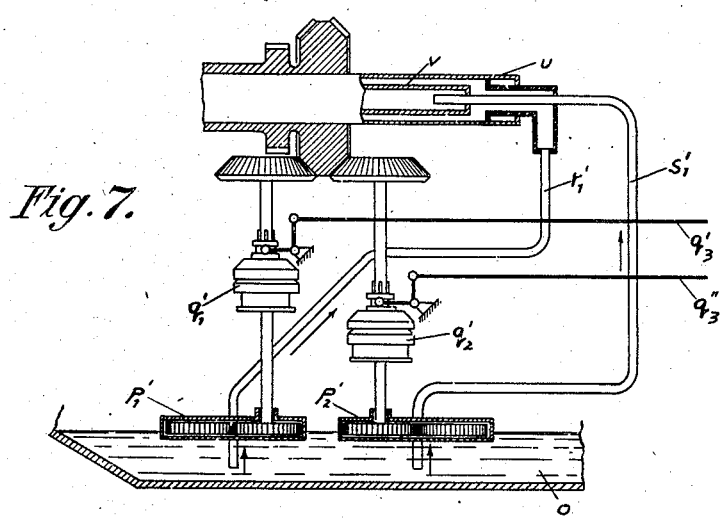
Figure 7 is a still further modified control arrangement for use with my transmission.

In the modified arrangement illustrated in Fig. 7 the control valves $q_1$ and $q_2$ have been entirely eliminated. Control of the pump fluid supplied to the transmission is effected solely by control clutches $q'_1$ and $q'_2$ driving the pumps $p'_1$ and $p'_2$ respectively. By suitable operation of the control or connecting rods $q'_3$ and $q''_3$ the clutches $q'_1$ and $q'_2$ may be operated in any desired manner to drivably connect or disconnect the fluid supplying pumps.

While I have illustrated and described certain improvements of my invention, it is to be understood that I am not limited thereto except as may be required by the claims which follow.

I claim:

1. A fluid transmission for interconnecting a load and a source of power, comprising, in combination, an impeller element connected to the source of power, a turbine element connected to the load, a free member intermediate said impeller and turbine elements, including a second turbine element cooperating with said impeller element to form a first working circuit, and a second impeller element cooperating with said first turbine element to form a second working circuit, separate conduits for respectively supplying fluid to said first and said second working circuits, and means for controlling the supply of fluid to said separate conduits.

2. The combination according to claim 1, in which said last means comprises a value device common to both conduits.

3. The combination according to claim 1, in which said last means includes means for supplying fluid to one conduit in advance of the supply to the other conduit.

4. The combination according to claim 1, in combination with a single casing enclosing said entire transmission and attached for movement with said free intermediate member, and means for rotatably supporting said casing.

5. A fluid transmission comprising, in combination, a driving shaft, an impeller element connected for rotation therewith, a driven shaft, a turbine element connected therewith, a free member intermediate said impeller and turbine elements, including a second turbine element cooperating with said impeller element to form a first working circuit, and a second impeller element cooperating with said first turbine element to form a second working circuit, a casing attached to said free intermediate member and enclosing the entire transmission, and bearings on the said driving and driven shafts for rotatably supporting said casing.

6. A fluid transmission for interconnecting a load and a source of power, comprising, in combination, an impeller element connected to the source of power, a turbine element connected to the load, a free member intermediate said impeller and turbine elements, including a second turbine element cooperating with said impeller element to form a first working circuit, and a second impeller element cooperating with said first turbine element to form a second working circuit, a casing attached to said free intermediate member and enclosing the entire transmission, and means for rotatably supporting said casing.

7. The combination according to claim 1, in which said last means comprises a valve adjustable to supply fluid to either, both or neither of said conduits.

8. The combination according to claim 1, in which said last means comprises a pair of rotatable valves, one in each conduit, and control means correlating and interconnecting said valves in such a manner that fluid may be supplied to either, both or neither of said conduits.

9. The combination according to claim 1, in which said last means comprises a pair of pumps for supplying fluid to respective conduits, means for driving said pumps, a clutch intermediate each pump and its driving means, and means for separately engaging and disengaging said clutches.

ARTHUR BERGER.